(12) United States Patent
Nam et al.

(10) Patent No.: US 7,440,424 B2
(45) Date of Patent: Oct. 21, 2008

(54) APPARATUS AND METHOD FOR DETECTING DUPLICATE IP ADDRESSES IN MOBILE AD HOC NETWORK ENVIRONMENT

(75) Inventors: Sang-su Nam, Seoul (KR); Min-soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 10/863,359

(22) Filed: Jun. 9, 2004

(65) Prior Publication Data

US 2004/0258007 A1    Dec. 23, 2004

(30) Foreign Application Priority Data

Jun. 19, 2003    (KR)    ............ 10-2003-0039773

(51) Int. Cl.
*H04B 7/00*    (2006.01)

(52) U.S. Cl. .................. 370/310; 370/386; 370/389; 370/332; 455/41.2

(58) Field of Classification Search ............. 370/310, 370/386, 389, 332, 395.52, 471, 473; 455/41.2
See application file for complete search history.

(56) References Cited

U.S. PATENT DOCUMENTS

| | | | | |
|---|---|---|---|---|
| 5,283,571 A | * | 2/1994 | Yang et al. | ............ 340/825.52 |
| 5,724,510 A | * | 3/1998 | Arndt et al. | ................ 709/220 |
| 5,758,282 A |  | 5/1998 | Yamashina et al. | |
| 6,307,843 B1 |  | 10/2001 | Okanoue | |
| 6,847,621 B1 | * | 1/2005 | Asahina | ................ 370/331 |
| 6,977,936 B1 | * | 12/2005 | Love et al. | ............... 370/395.5 |
| 7,075,897 B2 | * | 7/2006 | Uematsu | ..................... 370/255 |
| 2001/0017856 A1 | * | 8/2001 | Asokan et al. | ............. 370/389 |

(Continued)

FOREIGN PATENT DOCUMENTS

JP    11-41271 A    2/1999

(Continued)

OTHER PUBLICATIONS

Motoi Aoki, et al., "Name Resolution System for Mobile Ad Hoc Networks RANR (Randomly-Assigned Name Resolution)", Faculty of Policy Management, Faculty of Environmental Information; Graduate School of Media and Governance, vol. 2002, No. 24, ISSN 0919-6072, 2002-MBL-20, Mar. 8, 2002, pp. 233-241.

(Continued)

*Primary Examiner*—Matthew Anderson
*Assistant Examiner*—Minh D Dao
(74) *Attorney, Agent, or Firm*—Sughrue Mion, PLLC

(57) ABSTRACT

An apparatus and method operable to detect duplicate IP addresses in a mobile ad hoc network environment. A network apparatus operable to detect duplicate IP addresses in a mobile ad hoc network environment consistent with the present invention includes a database operable to store device information on each terminal and an IP address corresponding to the device information, an IP address duplicate detector operable to create an identifier for use in identifying a mobile ad hoc network based on the device information and the IP address and for processing a given packet for detecting duplicate IP addresses, and a packet transmitter/receiver operable to transmit/receive a Hello packet containing the identifier or the given packet for detecting duplicate IP addresses.

15 Claims, 15 Drawing Sheets

U.S. PATENT DOCUMENTS

| | | | |
|---|---|---|---|
| 2002/0044549 A1* | 4/2002 | Johansson et al. | 370/386 |
| 2002/0075836 A1 | 6/2002 | Uematsu | |
| 2004/0064591 A1* | 4/2004 | Noble | 709/250 |
| 2004/0225470 A1* | 11/2004 | Raykar et al. | 702/150 |
| 2004/0258007 A1* | 12/2004 | Nam et al. | 370/310 |
| 2006/0171388 A1* | 8/2006 | Ikeda | 370/389 |
| 2006/0215611 A1* | 9/2006 | Nakagawa et al. | 370/332 |

FOREIGN PATENT DOCUMENTS

| | | |
|---|---|---|
| JP | 2001-230789 A | 8/2001 |
| KR | 2002-0082471 A | 10/2002 |
| KR | 2002-0087905 A | 11/2002 |
| WO | WO 02/28034 A1 | 4/2002 |

OTHER PUBLICATIONS

Nesargi S et al:, "Manet conf: configuration of hosts in a mobile ad hoc network", Proceedings IEEE Infocom 2002. The Conference on Computer Communications. 21$^{st}$ Annual Joint Conference of the IEEE Computer and Communications Societies. New York, NY, Jun. 23-27, 2002, Proceedings IEEE Infocom. The Conference on Computer Communica, vol. 1 of 3, Conf. 21, Jun. 23, 2002, pp. 1059-1068, XP010593670.

Weniger K: "Passive duplicate address detection in mobile ad hoc networks" 2003 IEEE Wireless Communications and Networking Conference, vol. 3, Mar. 16, 2003, pp. 1504-1509, XP010639992.

McDonald A B et al: "A mobility-based framework for adaptive clustering in wireless ad hoc networks", IEEE Journal on Selected Areas in Communications, IEEE Inc, New York, US, vol. 17, No. 8, Aug. 1999, pp. 1466-1487, XP002249855, ISSN: 0733-8716.

Vaidya N H Ed—Association for Computing Machinery: "Weak Duplicate Address Detection in Mobile Ad Hoc Networks" Mobihoc 2002. Proceedings of the 3$^{rd}$. ACM International Symposium on Mobile Ad Hoc Networking and Computing. Lausanne, Switzerland, Jun. 9, 2002, pp. 206-216, XP001171560.

* cited by examiner

Hello packet format

| C_ID | Pre_C_ID | Hello_info |
|---|---|---|
| 64bit | 64bit | Variable |

DAD_Request packet format

| Type | S_IP_Address | S_Unique_Number | D_IP_Address |
|---|---|---|---|
| 8bit | 32bit | 64bit | 32bit |

FIG. 3C

DAD_Response packet format

| Type | S_IP_Address | S_Unique_Number | D_IP_Address | D_Unique_Number | DAD_Table |
|------|--------------|-----------------|--------------|-----------------|-----------|
| 8bit | 32bit | 64bit | 32bit | 64bit | N*96bit |

FIG. 3D

DAD_Complete packet format

| Type | S_Unique_Number | S_IP_Address | D_IP_Address |
|------|-----------------|--------------|--------------|
| 8bit | 64bit | 32bit | 32bit |

FIG. 3E

DAD_Delete packet format

| Type | D_Unique_Number | D_IP_Address |
|------|-----------------|--------------|
| 8bit | 64bit | 32bit |

FIG. 3F

C_ID_Change packet format

| Type | New_C_ID | Old_C_ID | S_IP_Address |
|------|----------|----------|--------------|
| 8bit | 64bit | 64bit | 32bit |

FIG. 4A

DAD table

| Unique_Number(64bit) | IP_Address(32bit) |
|---|---|
| Unique_Number_#1 | IP_Address_#1 |
| Unique_Number_#2 | IP_Address_#2 |
| Unique_Number_#3 | IP_Address_#3 |
| Unique_Number_#N | IP_Address_#N |

FIG. 4B

DAD_Request table

| C_ID (64bit) | IP_Address(32bit) | count(8bit) |
|---|---|---|
| C_ID_#1 | IP_Address_#1 | count_#1 |
| C_ID_#2 | IP_Address_#2 | count_#2 |
| C_ID_#3 | IP_Address_#3 | count_#3 |
| C_ID_#N | IP_Address_#N | count_#N |

Already used IP address table

APPARATUS AND METHOD FOR DETECTING DUPLICATE IP ADDRESSES IN MOBILE AD HOC NETWORK ENVIRONMENT

BACKGROUND OF THE INVENTION

This application claims the priority of Korean Patent Application No. 10-2003-0039773 filed on Jun. 19, 2003 in the Korean Intellectual Property Office, the disclosure of which is incorporated herein by reference.

1. Field of the Invention

The present invention relates to an apparatus and method operable to detect duplicate Internet Protocol (IP) addresses in a mobile ad hoc network (hereinafter, referred to as "MANET") environment, and more particularly, to a method of allocating IP addresses and detecting duplicate IP addresses as a single terminal participates in an already established MANET or is disconnected from and reconnected to the already established MANET while transmitting/receiving a Hello packet containing an identifier for identifying each MANET.

2. Description of the Related Art

As a network is constructed with no help of an infrastructure in a MANET environment, it is difficult to use protocols for automatically allocating IP addresses, such as Dynamic Host Configuration Protocol (DHCP) which is used in a wired network. Accordingly, it is required that each terminal itself allocates an IP address and detects duplicate IP addresses.

Operations in the related art are shown in FIGS. 1A and 1B. FIG. 1A is an exemplary view showing the structure of a MANET and an IP address detection method, and FIG. 1B is an exemplary view showing the order of allocation and duplicate detection of IP addresses performed in a conventional terminal.

For connection of terminal A to the MANET consisting of terminal B, terminal C and terminal D, terminal A selects an IP address that it intends to use, and then transmits a duplicate detection-requesting message in a broadcast manner, as shown in FIG. 1B. Terminals B, C and D then check whether the IP address collides with their own IP addresses. If there is no collision, terminals B, C and D do not transmit any messages. If there is a duplicate, terminals B, C and D transmit a duplicate detection message to terminal A that has issued the IP address duplicate detection-requesting message. At this time, if terminal A does not receive any duplicate detection messages for a certain period of time after transmitting the duplicate detection-requesting message, it determines that there is no duplicate and is then connected to the already established MANET.

As a MANET constructed without using infrastructure has not yet been commercialized, it does not have a specific standard function for the automatic allocation of IP addresses. Therefore, the MANET simply transmits its own IP address to peripheral terminals during an initial stage and detects duplicate IP addresses according to responses from the peripheral terminals.

However, since additional messages should be exchanged again if it is detected that an initially allocated IP address has been duplicated, this method may increase the load of the network. Furthermore, since all terminals have mobility, the terminals move among networks and connection or disconnection among networks frequently occurs. Because of this, such a method cannot easily perform the duplicate detection according to the connection or disconnection of a given network. Moreover, wireless packets are more sensitive to packet loss than wired packets. If a duplicate detection packet is lost and a new IP address is allocated, it is difficult to detect it again later. Even though it has been detected again, an IP address related to the duplication affects routing construction information. As a result, an incorrect routing table is formed and an existing connection may thus be disconnected.

SUMMARY OF THE INVENTION

The present invention addresses aforementioned problems. An aspect of the present invention is to provide an efficient method of allocating IP addresses and detecting duplicate IP addresses by defining a plurality of packet formats and tables for detecting the duplicate IP addresses and by providing a communication mechanism between terminals based on the defined packet formats and tables in a MANET environment.

Consistent with one aspect of the present invention, there is provided a network apparatus for detecting duplicate IP addresses in a mobile ad hoc network environment, comprising a database unit for storing device information on each terminal and an IP address corresponding to the device information, an IP address duplicate detection unit for creating an identifier for use in identifying a mobile ad hoc network based on the device information and the IP address and for processing a given packet for detecting duplicate IP addresses, and a packet transmitting/receiving unit for transmitting/receiving a Hello packet containing the identifier, or the given packet for detecting duplicate IP addresses. Consistent with an exemplary embodiment, the device information comprises a Media Access Control (MAC) address assigned to each terminal.

Consistent with another aspect of the present invention, there is provided a method of detecting duplicate IP addresses in a mobile ad hoc network environment, comprising storing device information on each terminal and an IP address corresponding to the device information, creating an identifier for use in identifying a mobile ad hoc network based on the device information and the IP address and processing a given packet for detecting duplicate IP addresses, and transmitting/receiving a Hello packet containing the identifier or the given packet for detecting duplicate IP addresses. Consistent with an exemplary embodiment, the device information comprises a MAC address assigned to each terminal. Further, the given packet may comprise a network information-requesting packet that requests information on an already established network, or a network information-providing packet that provides information on an already established network. The given packet may comprise a packet that provides information on a changed identifier when the identifier has changed.

BRIEF DESCRIPTION OF THE DRAWINGS

The above and other aspects, features and advantages of the present invention will become apparent from the following description of exemplary embodiments given in conjunction with the accompanying drawings, in which:

FIG. 2 is an exemplary view showing a terminal in a mobile ad hoc network environment consistent with the present invention;

FIGS. 3A to 3F are exemplary views showing packet formats consistent with the present invention;

FIGS. 4A to 4C are exemplary views showing a plurality of table formats consistent with the present invention;

DETAILED DESCRIPTION OF THE INVENTION

Hereinafter, an apparatus and method for detecting duplicate IP addresses in a MANET environment consistent with exemplary embodiments of the present invention will be described in detail with reference to the accompanying drawings.

Figure 1A:
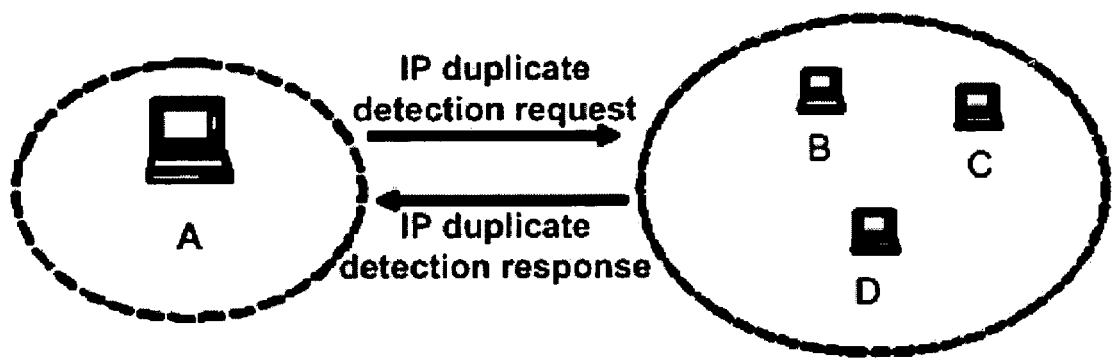
FIGS. 1A and 1B are exemplary views showing the configuration of a mobile ad hoc network and the order of detection of duplicate IP addresses, respectively.
Figure 1B:
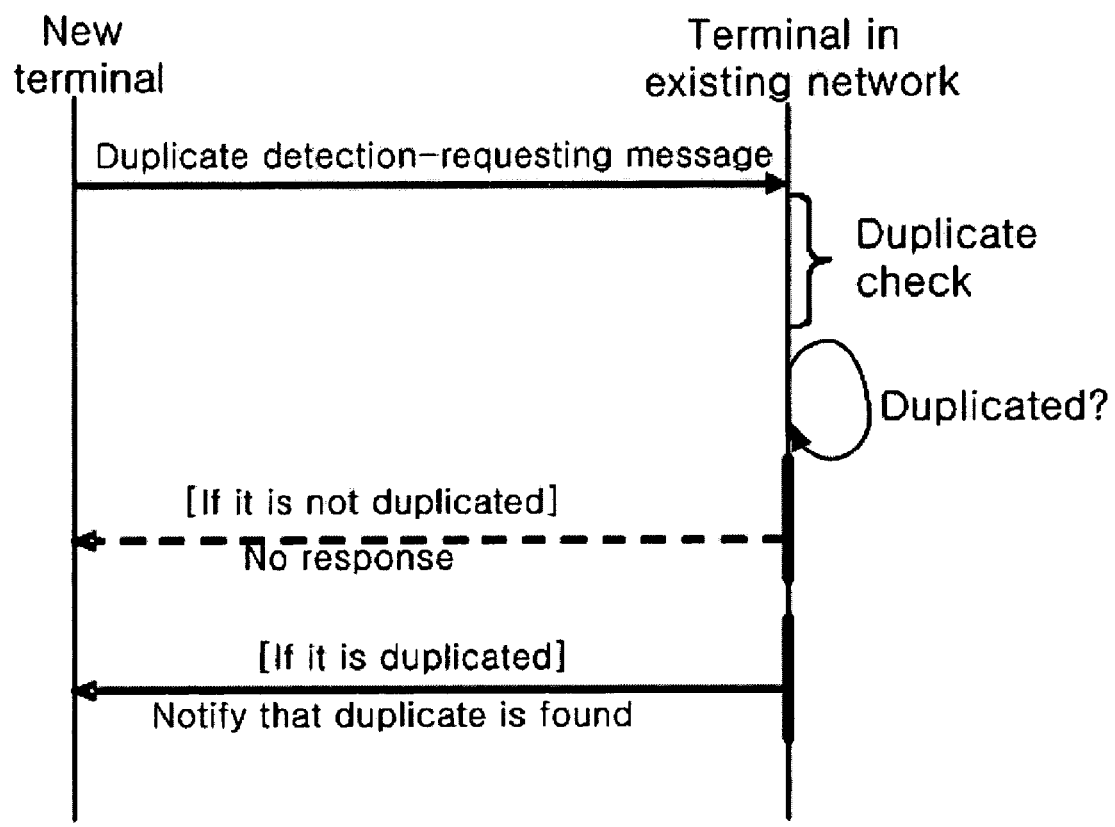
Figures 2, 3A, 3B:
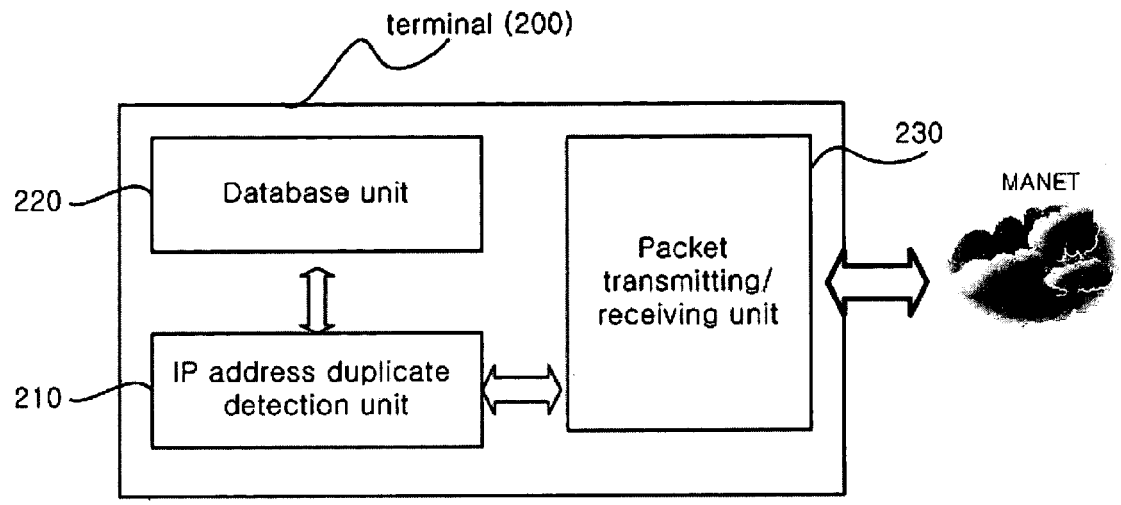

FIG. 2 is an exemplary view showing a terminal 200 in a MANET environment consistent with the present invention. The terminal 200 comprises a database unit 220 for storing device information on the terminal and an IP address corresponding to the device information, an IP address duplicate detection unit 210 for creating an identifier for use in identifying a MANET based on the device information and the IP address and for processing a given packet for detecting duplicate IP addresses, and a packet transmitting/receiving unit 230 for transmitting/receiving a Hello packet containing an identifier or the given packet for detecting duplicate IP addresses. At this time, the device information may use a MAC address unique to each terminal, and routing information about a relevant network may be included in the database unit 220. The process of detecting duplicate IP addresses depending on the transmission/reception of packets to/from other terminals will be described later.

FIGS. 3A to 3F are exemplary views showing packet formats consistent with the present invention. FIG. 3A shows a 'Hello' packet format, FIG. 3B shows a 'DAD_Request' packet format, FIG. 3C shows a 'DAD_Response' packet format, FIG. 3D shows a 'DAD_Complete' packet format, FIG. 3E shows a 'DAD_Delete' packet format and FIG. 3F shows a 'C_ID_Change' packet format.

The 'Hello' packet format shown in FIG. 3A is periodically forwarded in a broadcast manner. This packet allows respective terminals to recognize the presence of the 'Hello' packets. The 'Hello' packet consists of a 'Hello_info' field containing routing information such as a sender's subnet and network addresses and the like, a 'C_ID' field indicating a current connection identifier (hereinafter, referred to as 'C_ID') that identifies each MANET, and a 'Pre_C_ID' field indicating a previous identifier (hereinafter, referred to as 'Pre_C_ID').

The 'DAD_Request' packet format shown in FIG. 3B is a packet format that requests a duplicate address detection table (hereinafter, referred to as 'DAD table') containing information on respective terminals belonging to a specific MANET. The DAD_Request packet consists of a 'S_P_Address' field indicating a sender's IP address, a 'S_Unique_Number' field indicating a unique number of a sender's terminal, and a 'D_IP_Address' field indicating a receiver's IP address. At this time, the terminal's unique number (hereinafter, referred to as 'Unique_Number') is an identification number obtained by combining a terminal's MAC address and a random number by means of a predetermined method to identify respective terminals. In the present invention, a 'Unique_Number' value of a terminal having the highest IP address belonging to a specific MANET is used as the 'C_ID' value. Meanwhile, as a network has not yet been established when a terminal initially operates, the 'C_ID' value sets all random numbers to '1' and has a value of 'FFFF/48' in which the MAC address of 48 bits are combined.

The 'DAD_Response' packet format shown in FIG. 3C is a packet format that provides the DAD table. The 'DAD_Response' packet consists of a 'S_IP_Address' field indicating the sender's IP address, the 'S_Unique_Number' field indicating the unique number of the sender's terminal, a 'D_P_Address' field indicating a receiver's IP address, a 'D_Unique_Number' field indicating a unique number of the receiver's terminal, and a 'DAD_Table' field indicating DAD table information held by the sender.

The 'DAD_Complete' packet format shown in FIG. 3D is a packet format for notifying the completion of the detection of duplicate IP addresses after a counterpart's DAD table is received among terminals and a terminal's own DAD table is updated if there are no duplicates detected between the terminal's own DAD table and the received DAD table. This packet consists of the 'S_Unique_Number' field indicating the unique number of the sender's terminal, the 'S_P_Address' field indicating the sender's IP address and the 'D_IP_Address' field indicating the receiver's IP address.

The 'DAD_Delete' packet format shown in FIG. 3E is a packet that is transmitted when there is a duplicate as a result of the comparison of a terminal's own DAD table with a counterpart's DAD table. This packet consists of the 'D_Unique_Number' field indicating the unique number of the receiver's terminal and the 'D_IP_Address' field indicating the receiver's IP address.

The 'C_ID_Change' packet format shown in FIG. 3F is a packet format notifying that 'C_ID' information of the MANET to which a given terminal belongs has been changed. This format consists of a 'New_C_ID' field indicating a new 'C_ID', an 'Old_C_ID' field indicating a previous 'C_ID' and the 'S_IP_Address' field indicating the sender's IP address.

Meanwhile, Table 1 below shows the types of packet transmission methods and set values corresponding thereto.

TABLE 1

| Type | | Set Value |
|---|---|---|
| DAD_Request | 1-hop broadcast | 00000001 |
| | unicast | 00000010 |
| DAD_Response | 1-hop broadcast | 00000100 |
| | broadcast | 00000101 |
| | unicast | 00000110 |
| DAD_Complete | 1-hop broadcast | 00001000 |
| | broadcast | 00001001 |
| DAD_Delete | 1-hop broadcast | 00001010 |
| C_ID_Change | broadcast | 00001100 |

Figure 4C:
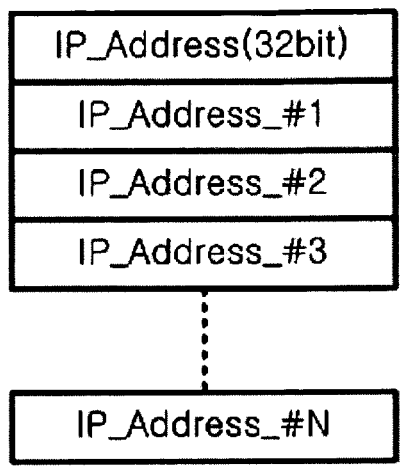

FIGS. 4A to 4C are exemplary views showing a variety of table formats consistent with the present invention. FIG. 4A shows a DAD table having a 'Unique_Number' field indicating a unique number of each terminal belonging to a specific MANET, and an 'IP_Address' field indicating an IP address of each terminal.

Further, FIG. 4B shows a DAD_Request table comprising a 'C_ID' field for identifying a MANET to which a sender belongs when a terminal receives a 'DAD_Request' packet, an 'IP_Address' field indicating a sender's IP address, and a 'count' field indicating the number of times the DAD_Request packet has been received from the sender having information on the 'C_ID' and 'IP_Address.' FIG. 4C shows an already used IP address table that stores the history of IP addresses assigned to a terminal. The already used IP address table is referred to when an IP address is re-allocated to the terminal. Therefore, it creates less confusion over the entire MANET by lowering the probability that an IP address would be changed in a case where a terminal is temporarily deviated from the MANET or an IP address is re-allocated to the terminal through resetting.

Figure 5:
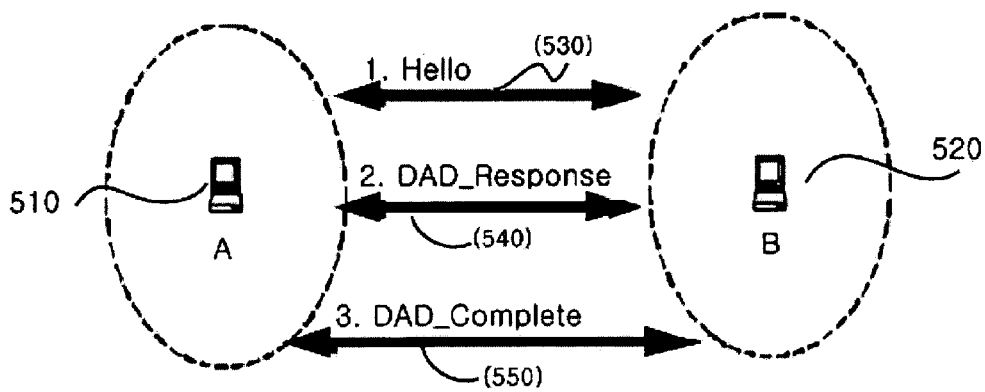
FIG. 5 is an exemplary view illustrating the process of initially forming a MANET between two terminals.

FIG. 5 is an exemplary view illustrating the process of initially forming a MANET between two terminals. It is assumed that terminal A 510 has an IP address of '169.254.0.126', and 'Unique_Number' of '1F4A/48' consisting of a random number of '1F4A' and a 48-bit MAC address for terminal A 510. It is also assumed that terminal B 520 has an IP address of '169.254.0.116', and 'Unique_Number' of '1F3A/48' consisting of a random number of '1F3A' and a 48-bit MAC address for terminal B 520. Since each of terminals A 510 and B 520 has not yet constructed a network, the 'C_ID' field of the Hello packet format shown in FIG. 3*a* is set to 'FFFF/48,' all the 'Pre_C_ID' fields are set to '0,' and the 'Hello' field is set to the contents that comprise routing information held by each terminal.

The process of constructing a MANET between terminal A 510 and terminal B 520 comprises recognizing the presence of a counterpart while exchanging Hello packets with each other (530), receiving a counterpart's DAD table using a DAD_Response packet (540), and transmitting/receiving a DAD_Complete packet if a duplicate address is not detected as a result of comparing the received DAD table and a terminal's own DAD table (550).

Figure 6:
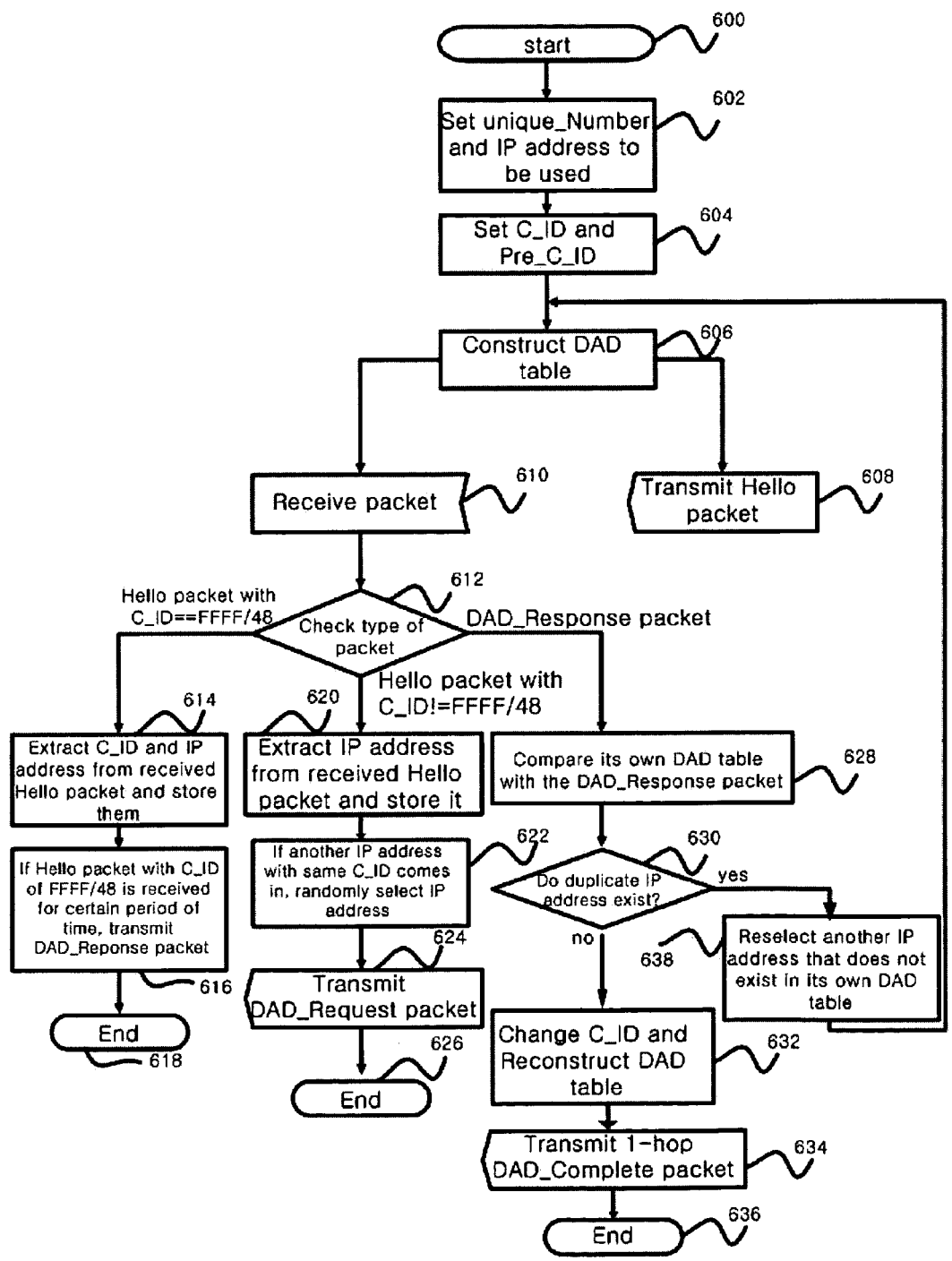
FIG. 6 is a flowchart illustrating the process of initially constructing a network in a state where connection to a network has not been made, consistent with an embodiment of the present invention.

FIG. 6 is a flowchart illustrating the process of initially constructing a network in a state where connection to a network has not been made, consistent with an embodiment of the present invention. If a terminal is powered (600), the terminal sets 'Unique_Number', created by a combination of its own MAC address and a random number, and its own IP address (602). Further, the terminal sets 'C_ID' and 'Pre_C_ID' values (604). The terminal constructs an initial DAD table that is composed of the set 'Unique_Number' and the IP address (606). At this time, the 'C_ID' value is set to 'FFFF/48' and all the 'Pre_C_ID' values are set to '0.' The terminal transmits a Hello packet in a broadcast manner in order to notify its presence (608) or receives predetermined packets from other peripheral terminals (610).

If the terminal receives packets from other peripheral terminals, then the terminal checks the type of packet (612). If the 'C_ID' value of the received packet is 'FFFF/48', which means that the terminal that sent the packet has not yet constructed a network, the terminal extracts the 'C_ID' and the IP address from the received packet and then stores them in a DAD_Request table (614). If a packet containing 'C_ID' information and an IP address is received for a certain period of time, the terminal transmits a DAD_Response packet shown in FIG. 3C to a terminal that has sent the packet (616).

Meanwhile, if the DAD_Response packet is received, the terminal that has received the DAD_Response packet compares the sender's DAD table information contained in the DAD_Response packet and its own DAD table (628). Next, the terminal checks whether there are duplicate IP addresses (630). If there are no duplicate IP addresses, the terminal reconstructs its own DAD table by adding the sender's DAD table information to its own DAD table and sets the value of the 'Unique_Number' field of a terminal having the highest IP address in the reconstructed DAD table as 'C_ID' (632). Hereinafter, in the Hello packet, the value of the 'C_ID' field is set to a new 'C_ID' value and the 'Pre_C_ID' field is set to the previous 'C_ID' value and then transmitted. Upon completion of step (632), the 'DAD_Complete' packet shown in FIG. 3D is transmitted in the '1-hop broadcast' type shown in Table 1 (634).

If there are duplicate IP addresses in step (630), the terminal selects another IP address that does not exist in its own DAD table (638) and then constructs the DAD table (606).

Meanwhile, if the packet received in step (610) is a Hello packet of which the 'C_ID' value is not 'FFFF/48,' which means that the Hello packet has been received from a terminal that has already constructed a MANET, the terminal extracts an IP address from the Hello packet and then stores it (620). The terminal transmits a DAD_Request packet that requests the counterpart terminals' DAD table information (624). If another IP address having the same 'C_ID' is received, the terminal randomly selects an IP address (622) and then transmits the DAD_Request packet (624).

When the process of causing the terminal, which has not yet been connected to a network, to be connected to an already established MANET, as shown in FIG. 5 and FIG. 6, is called an initial mode, an operating process in a state in which the terminal is connected to an already established network can be called a normal mode. FIGS. 7 to 12 illustrate operating processes depending on the reception of various types of packets for detecting duplicate IP addresses shown in Table 1 by a terminal operating in normal mode.

Figure 7:
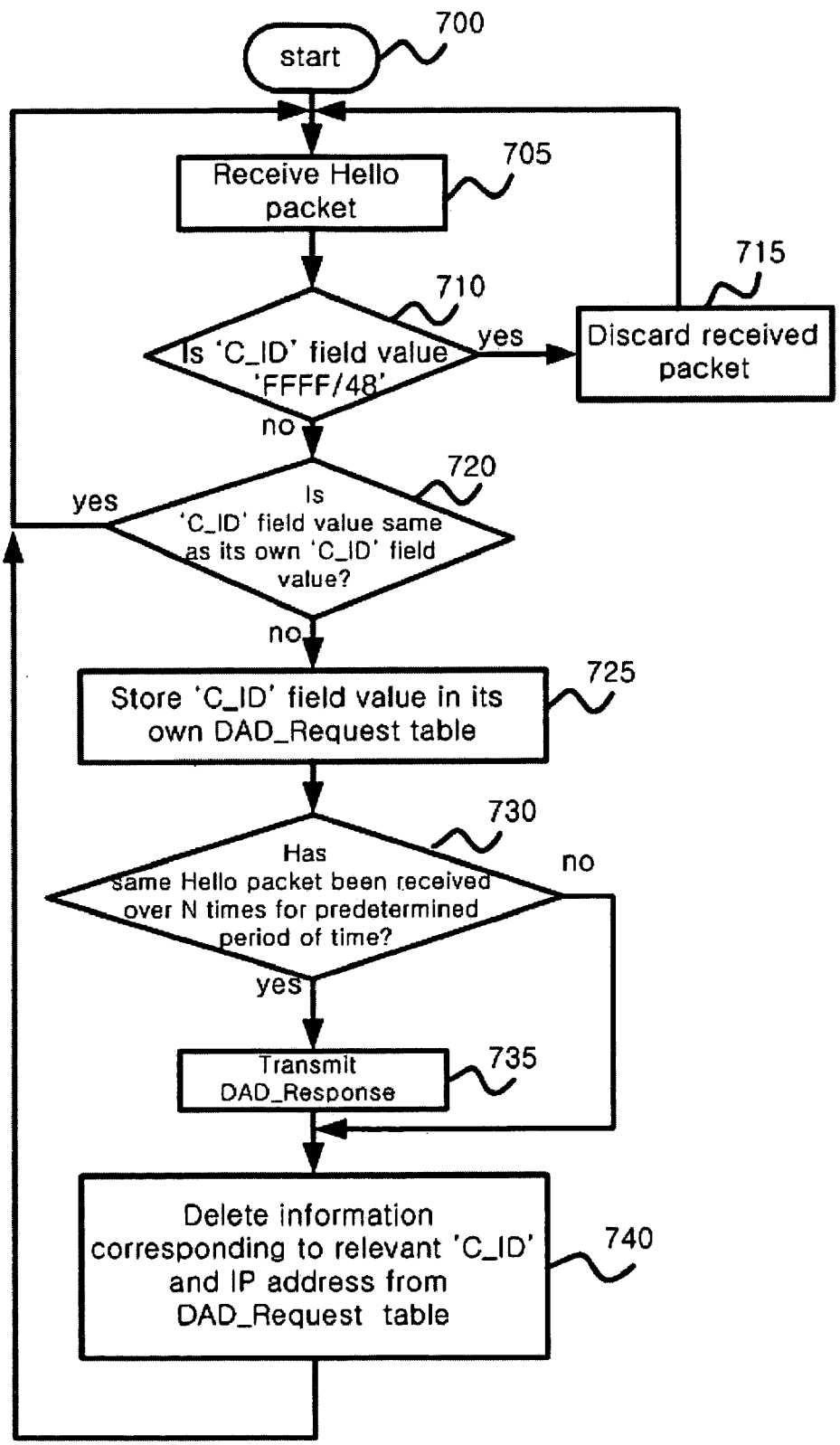
FIG. 7 is a flowchart illustrating an operating process depending on the reception of a Hello packet by a terminal operating in normal mode, consistent with an embodiment of the present invention.

FIG. 7 is a flowchart illustrating an operating process depending on the reception of a Hello packet by a terminal operating in normal mode, consistent with an embodiment of the present invention. The terminal receives the Hello packet (705). The terminal determines whether a 'C_ID' field value of the received Hello packet is set to 'FFFF/48' (710). If the 'C_ID' field value of the received Hello packet is set to 'FFFF/48,' the terminal discards the received Hello packet (715). If the 'C_ID' field value is not set to 'FFFF/48' and is different from its own 'C_ID' value, the terminal extracts sender's IP address information from the received Hello packet and then stores it in the DAD_Request table shown in FIG. 4B (710, 720, 725).

Meanwhile, if it is determined that the number of times the same Hello packet has been received for a predetermined period of time is over a predetermined 'count' field value by means of the 'count' field in the DAD_Request table, the terminal transmits a DAD_Response packet to an IP address of a terminal that has sent the Hello packet (730, 735). At this time, if the same Hello packet has not been received over N times for the predetermined period of time, or after the DAD_Response packet was transmitted, the terminal deletes relevant information on 'C_ID' and 'IP_Address' from the DAD_Request table (740).

Figure 8:
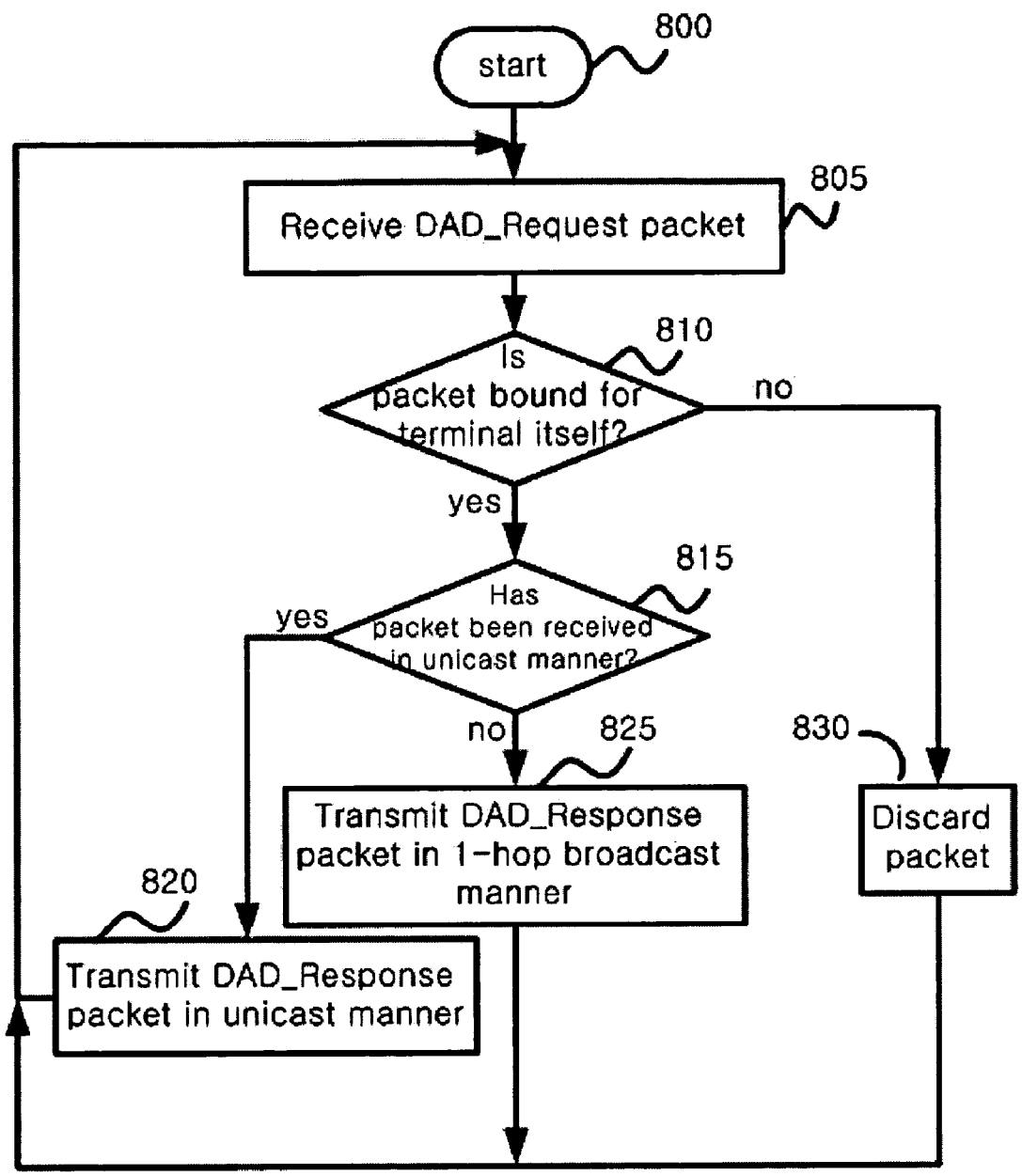
FIG. 8 is a flowchart illustrating an operating process depending on the reception of a DAD_Request packet by the terminal operating in normal mode, consistent with an embodiment of the present invention.

FIG. 8 is a flowchart illustrating an operating process depending on the reception of a DAD_Request packet by a terminal operating in normal mode, consistent with an embodiment of the present invention. The terminal receives a DAD_Request packet (805), and checks whether the received DAD_Request packet is a packet that is bound for the terminal (810). If the packet is a packet that is bound for the terminal, the terminal checks whether the packet has been received in a unicast manner or 1-hop broadcast manner (815). If the packet has been received in a unicast manner, the terminal transmits the DAD_Response packet in the unicast manner (820). If the packet has been received in the 1-hop broadcast manner, the terminal transmits the DAD_Response packet in the 1-hop broadcast manner (825). Meanwhile, if it is determined in step (810) that the received DAD_Request packet is not a packet that is bound for the terminal, the terminal discards the received packet (830).

Figure 9:
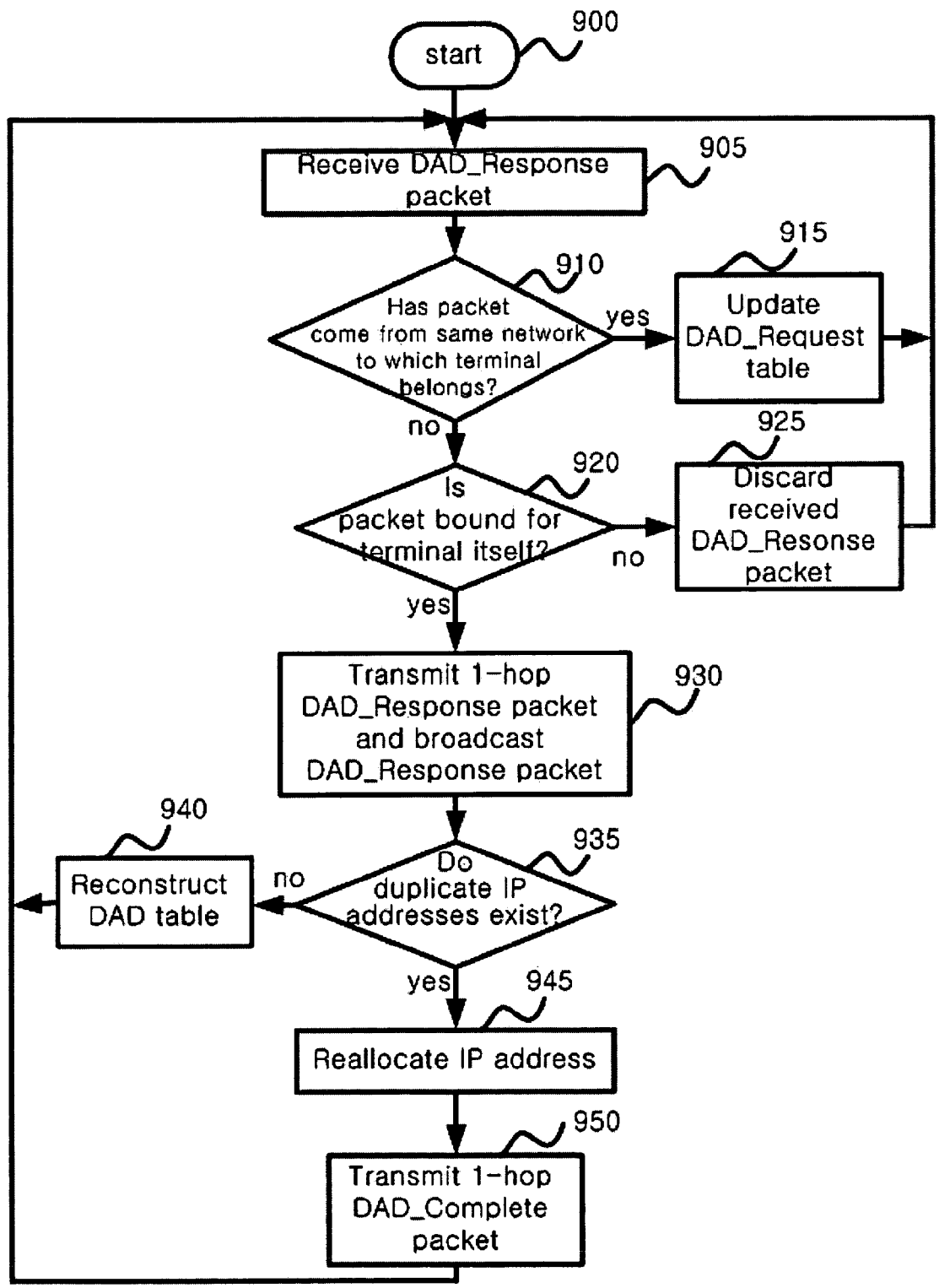
FIG. 9 is a flowchart illustrating an operating process depending on the reception of a DAD_Response packet by the terminal operating in normal mode, consistent with an embodiment of the present invention.

FIG. 9 is a flowchart illustrating an operating process depending on the reception of a DAD_Response packet by a terminal operating in normal mode, consistent with an embodiment of the present invention. The terminal receives a DAD_Response packet (905) and determines whether the received DAD_Response packet is received from a network to which the terminal belongs (910). If the packet has been received from the network to which the terminal belongs, the terminal updates its own DAD_Request table (915). This is to prevent the repeated transmission of DAD_Response packets having the same purpose.

Meanwhile, in a case where the packet has been received from a network different from the network to which the terminal belongs, if the packet is not bound for the terminal, the terminal discards the received packet (910, 920, 925). If the packet is bound for the terminal, the terminal transmits a 1-hop DAD_Response packet to a sender's terminal, broadcasts the received DAD_Response packet to other terminals having the same C_ID as the terminal and checks whether duplicate IP addresses exist (910, 920, 930, 935). If there are duplicate IP addresses, the terminal performs the process of re-allocating an IP address for reselecting an IP address that is not present in the DAD table (945) and then transmits a 1-hop DAD_Complete packet (950).

Meanwhile, if there are no duplicate IP addresses, the terminal updates a 'Unique_Number' value of a terminal, which has the highest IP address in the DAD table, with 'C_ID', and reconstructs the DAD table (940). At this time, 'Pre_C_ID' of the Hello packet is replaced with a 'C_ID' value that was previously used, and 'C_ID' is replaced with a 'C_ID' value that is newly selected. With the transmission of the newly selected 'C_ID' along with the previous 'C_ID,' even though 'C_ID' is not changed due to loss of a packet, it is possible to later modify 'C_ID' in consideration of the 'Pre_C_ID' value of the Hello packet. As a result, the terminal is prevented from being disconnected from the existing network.

Figure 10:
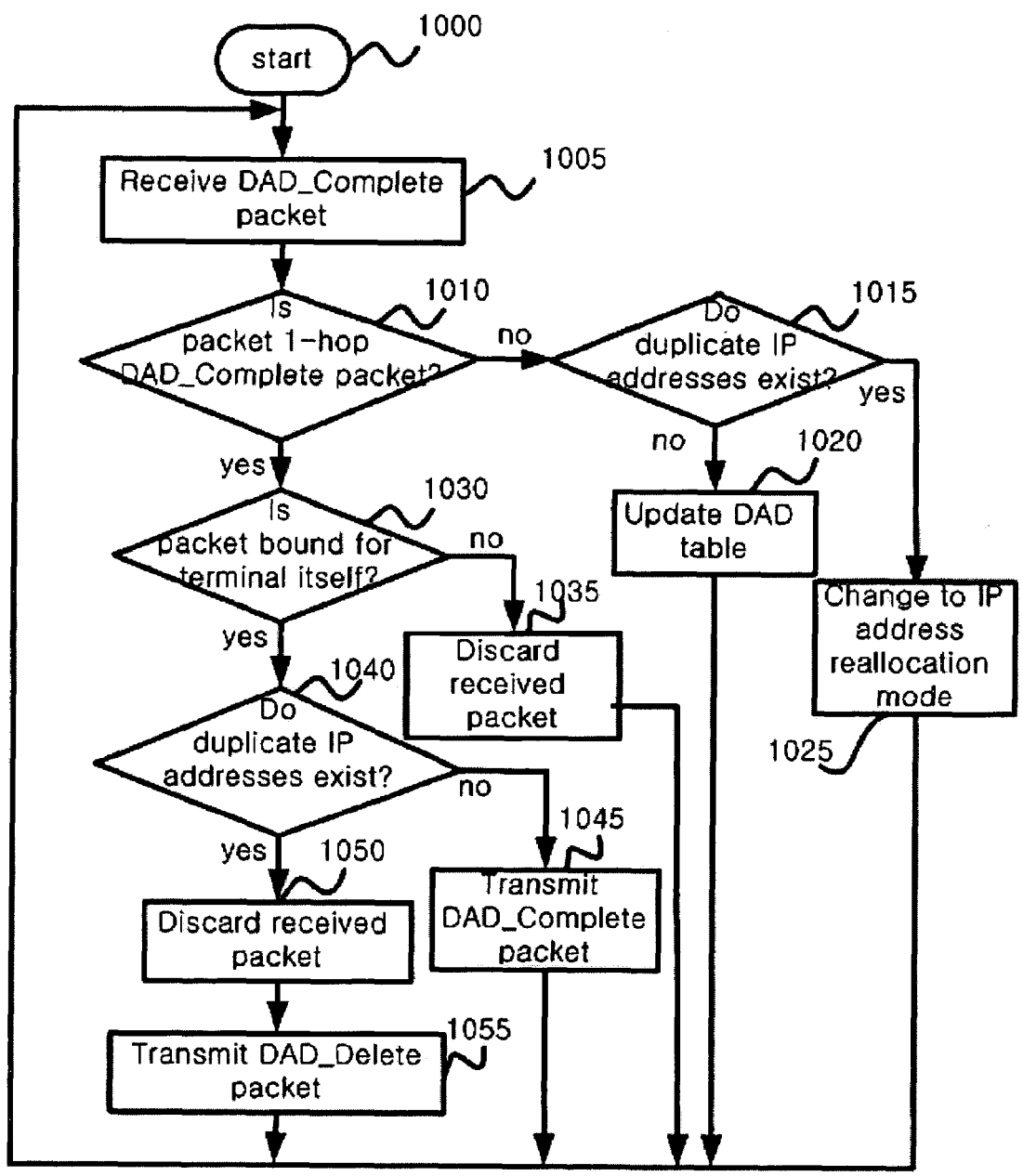
FIG. 10 is a flowchart illustrating an operating process depending on the reception of a DAD_Complete packet by the terminal operating in normal mode consistent with an embodiment of the present invention.

FIG. 10 is a flowchart illustrating an operating process depending on the reception of a DAD_Complete packet by a terminal operating in normal mode consistent with an embodiment of the present invention. If the terminal receives a DAD_Complete packet (1005), it determines whether the packet is a 1-hop DAD_Complete packet (1010). If the packet is the 1-hop DAD_Complete packet, the terminal checks whether the packet is bound for the terminal (1030). If the packet is bound for the terminal, the terminal compares the received packet with its own DAD table (1040). If there are duplicate IP addresses, the terminal discards the received packet (1050) and then transmits a DAD_Delete packet (1055). If there are no duplicate IP addresses, the terminal transmits a DAD_Complete packet (1045).

Meanwhile, if it is checked in step (1030) that the received DAD_Complete packet is not bound for the terminal, the terminal discards the received packet (1035). If it is determined in step (1010) that the received packet is not a 1-hop DAD_Complete packet, the terminal compares the received packet with its own DAD table (1015). If there are duplicate IP addresses, the terminal re-allocates an IP address (1025). If there are no duplicate IP addresses, the terminal updates the DAD table (1020).

Figure 11:
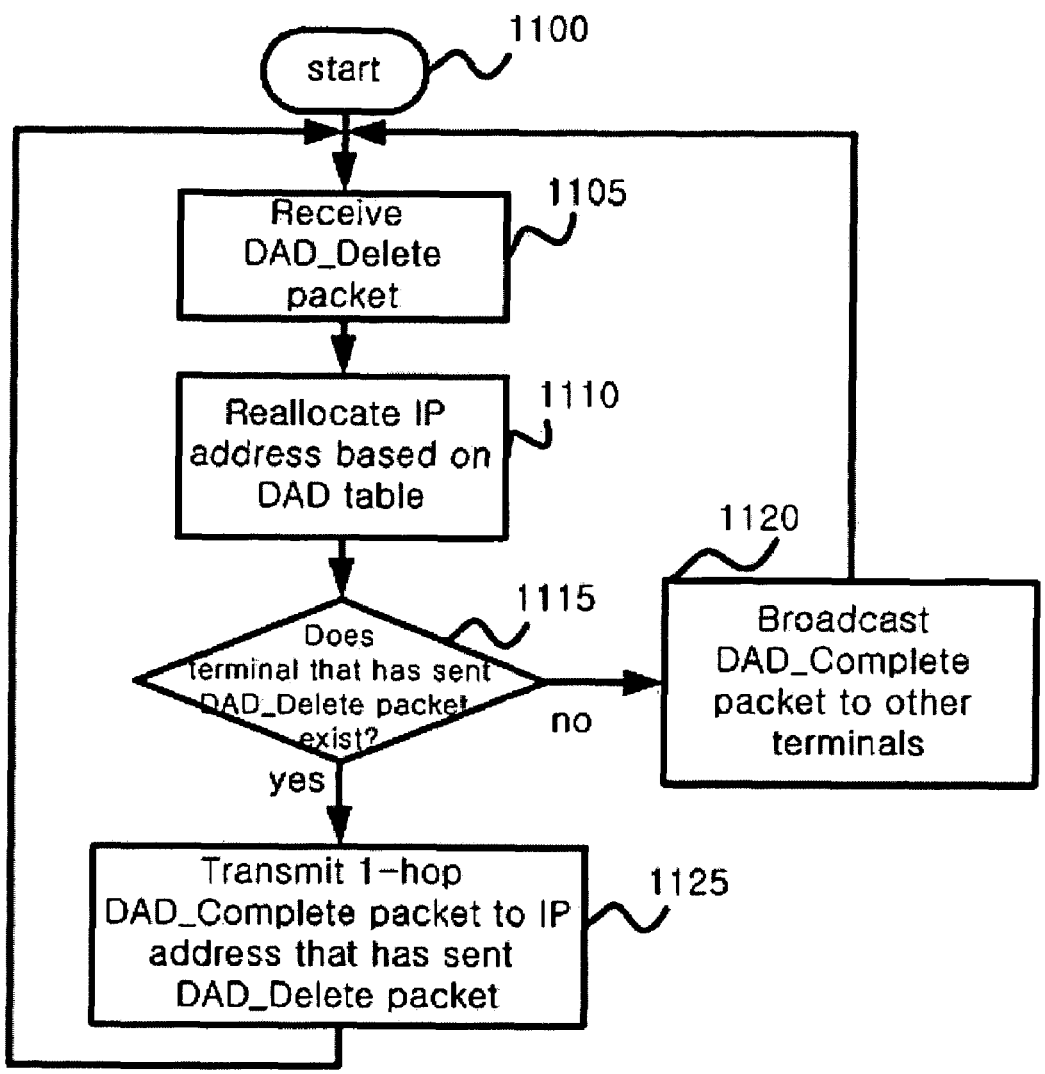
FIG. 11 is a flowchart illustrating an operating process depending on the reception of a DAD_Delete packet by the terminal operating in normal mode consistent with an embodiment of the present invention.

FIG. 11 is a flowchart illustrating an operating process depending on the reception of a DAD_Delete packet by a terminal operating in normal mode consistent with an embodiment of the present invention. If the terminal receives a DAD_Delete packet (1105), which means that a currently used IP address has been duplicated, the terminal re-allocates its own IP address based on the DAD table (1110). Then, if there is a terminal that has sent the DAD_Delete packet, a DAD_Complete packet is transmitted to the terminal that has sent the DAD_Delete packet (1115, 1125). If no terminal has sent a DAD_Delete packet, the DAD_Complete packet is retransmitted to other terminals (1115, 1120).

Figure 12:
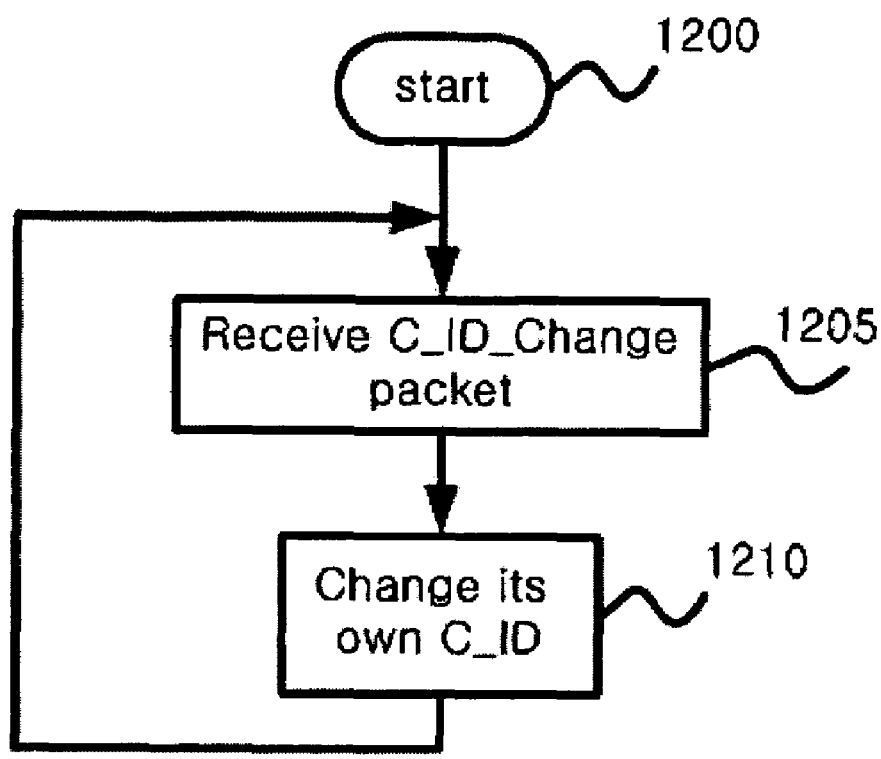
FIG. 12 is a flowchart illustrating an operating process depending on the reception of a C_ID_Change packet by the terminal operating in normal mode consistent with an embodiment of the present invention.

FIG. 12 is a flowchart illustrating an operating process depending on the reception of a C_ID_Change packet by a terminal operating in normal mode consistent with an embodiment of the present invention. If the terminal receives a C_ID_Change packet (1205), it changes its own 'C_ID' (1210). At this time, a previous 'C_ID' value is replaced with 'Pre_C_ID.'

Figure 13:
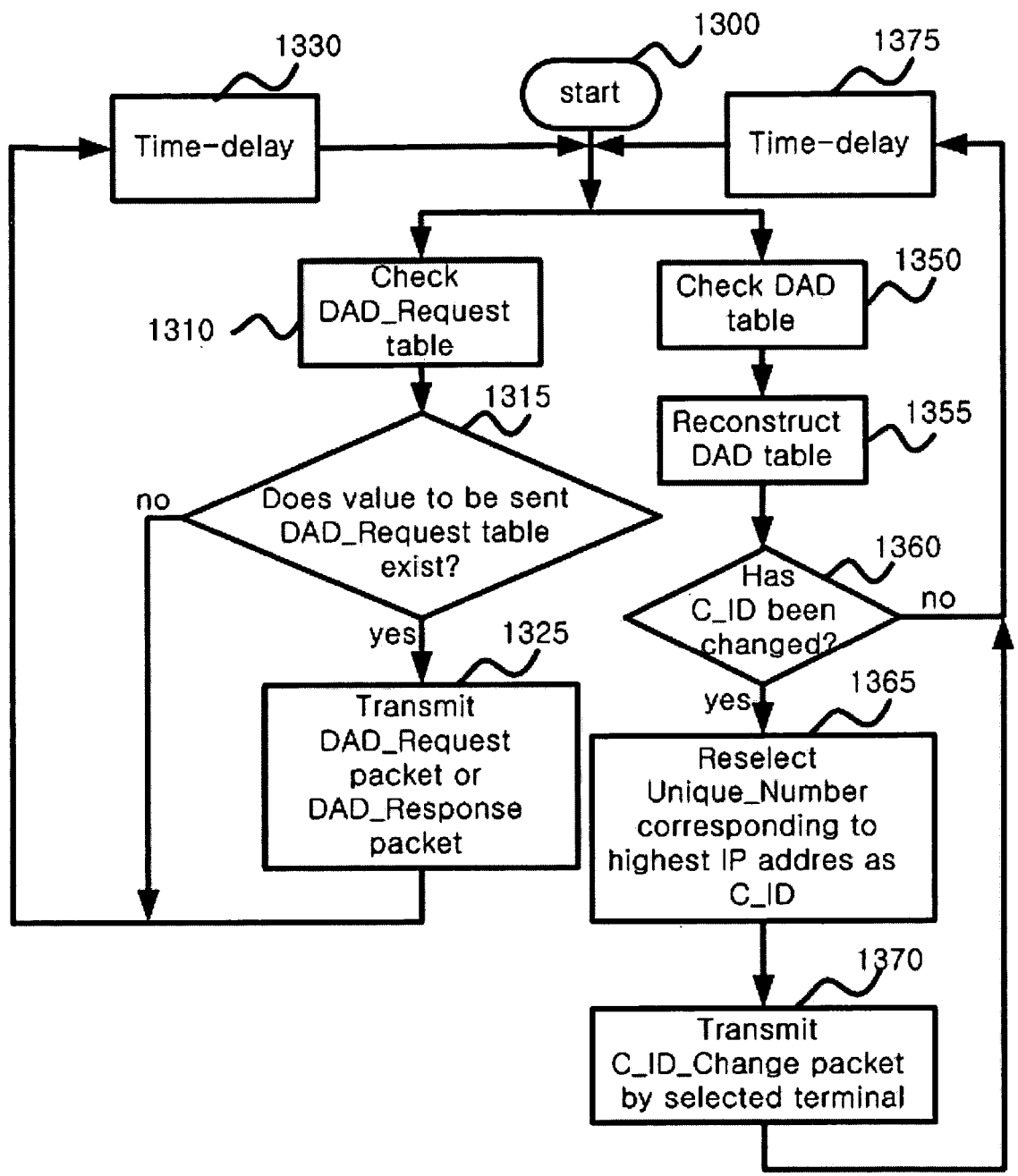
FIG. 13 is a flowchart illustrating a method of periodically managing a DAD_Request table and a DAD table by the terminal in normal mode consistent with an embodiment of the present invention.

FIG. 13 is a flowchart illustrating a method of periodically managing a DAD_Request table and a DAD table by a terminal in normal mode consistent with an embodiment of the present invention. Each terminal checks its DAD table (1350), and then compares the DAD table with its own routing information and reconstructs the DAD table depending on changed matters (1355). Thereafter, the terminal checks whether its 'C_ID' has been changed (1360). If its 'C_ID' has been changed, the terminal reselects a 'Unique_Number' of a terminal, which has the highest IP address in the DAD table, as 'C_ID' (1365). A terminal corresponding to the selected 'Unique_Number' transmits a C_ID_Change packet (1370).

After a predetermined period of time passes (1375), the terminal repeatedly checks its DAD table (1350). At this time, if it is checked in step (1360) that the 'C_ID' has not been changed, the terminal repeatedly performs step (1350) after a predetermined period of time passes (1375). Meanwhile, if there is an IP address for the terminal but there is no 'Unique_Number' value due to the loss of a packet or the like upon reconstruction of the DAD table as in step (1355), the terminal transmits the DAD_Request packet to the relevant IP address. If there is no peripheral terminal, the terminal sets its mode to an initial state and sets its 'C_ID' to FFFF/48. If another terminal newly enters the network, a previously used IP address is preferentially utilized by using the already used IP address table shown in FIG. 4C.

Meanwhile, each terminal also checks the DAD_Request table (1310). Then, the terminal checks whether there is a value to be sent in the DAD_Request table (1315). If there is a value to be sent therein, the terminal sends a DAD_Request packet or DAD_Response packet (1325). After a predetermined period of time passes (1330), the terminal repeatedly checks the DAD_Request table (1310). Meanwhile, if it is checked in step (1315) that there is nothing of value to be sent, the terminal repeatedly checks the DAD_Request table (1310) after a predetermined period of time passes (1330).

Meanwhile, 'C_ID' is initially selected from a 'Unique_Number' value of a terminal having the highest IP address. In the case of connection between networks, the selection is changed again. If a terminal having an IP address higher than an IP address of a terminal having the same 'Unique_Number' as the 'C_ID' value of an already established network enters the initial mode, the already established network keeps the existing ' C_ID.'

However, if a terminal using its own 'Unique_Number' value as 'C_D' finds a terminal having an IP address higher than its own IP address while periodically updating the DAD table, it stores the highest IP address and sets a predetermined index value to 1. Even in the next periodical updating, the terminal checks whether the IP address exists. If the IP address exists, the terminal increases the index value by 1. If the IP address does not exist, the terminal deletes the index value. Further, if another higher IP address comes in, the terminal deletes a previous IP address and the index value, stores a new IP address and then sets the index value to 1. If the index value is over a predetermined setting value N, the terminal can replace its own 'C_ID' with a 'Unique_Number' value of an IP address higher than its own IP address by transmitting the C_ID_Change packet.

Figure 14:
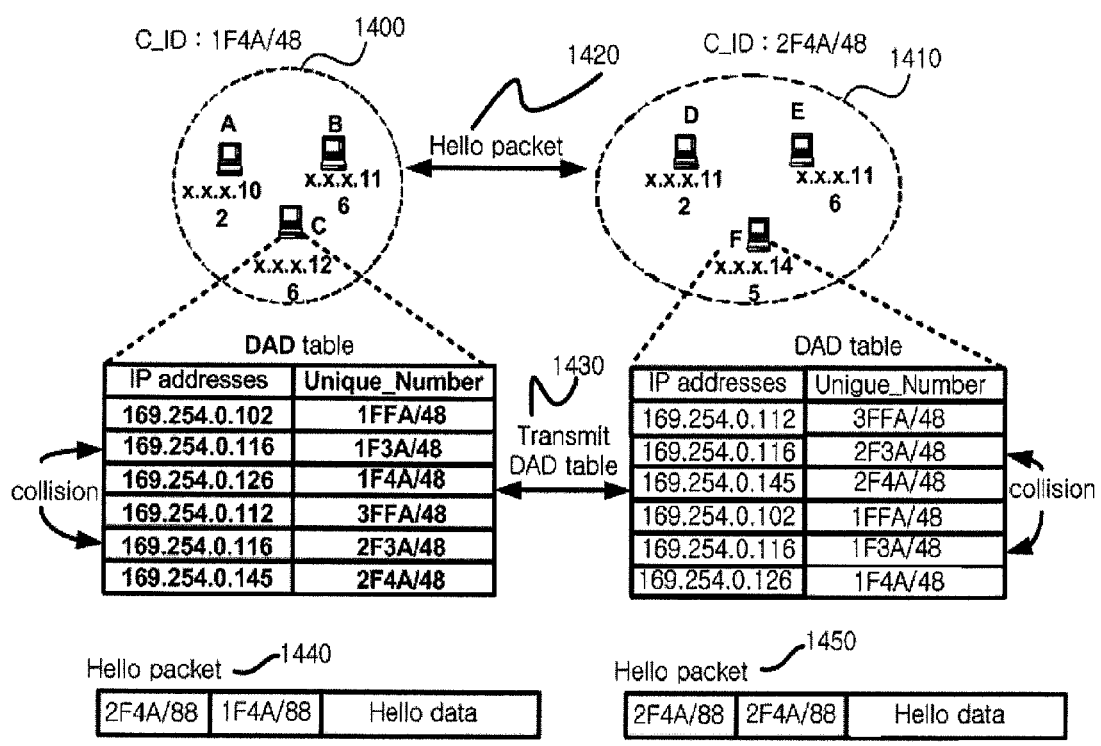
FIG. 14 is an exemplary view showing operations of separate MANETs cooperating with each other.

FIG. 14 is an exemplary view showing operations of separate MANETs cooperating with each other. A network 1400 consists of terminal A, terminal B and terminal C, and has a 'C_ID' of '1F4A/48'=0 corresponding to the 'Unique_Number' of terminal C having the highest IP address. A network 1410 consists of terminal D, terminal E and terminal F, and has a 'C_ID' of '2F4A/48' corresponding to the ' Unique_Number' of terminal F having the highest IP address. The networks 1400 and 1410 recognize the presence of their counterparts by exchanging Hello packets (1420). Thereafter, the networks 1400 and 1410 exchange their DAD tables by exchanging packets for duplicate detection proposed by the present invention (1430).

At this time, a collision occurs since the IP addresses of terminals B and E are the same. In this case, the Unique_Number values thereof are compared with each other, and the IP address of terminal E that has a higher Unique_Number value than that of terminal B is not changed but the IP address of terminal B that has a lower Unique_Number value than that of terminal E is changed, and then a new IP address is allotted to terminal B. Since the 'C_ID' value is set to the 'C_ID' field value of the highest IP address, the 'C_ID' field values of terminals A, B and C are set to the 'C_ID' field value of terminal F having the highest IP address. Therefore, as the two MANETs shown in FIG. 14 are integrated, terminals A, B and C send a Hello packet of which the 'C_ID' field value is set to '2F4A/48' and the 'Pre_C_ID' field value is set to '1F4A/48' that is the previous 'C_ID' (1440). Further, terminals D, E and F transmit a Hello packet of which the 'C_ID' field value is set to '2F4A/48' and the 'Pre_C_ID' field value is set to '2F4A/48' that is the previous 'C_ID' (1450).

Meanwhile, in a case where a terminal having a 'C_ID' is deleted from the DAD table, which means that the network is disconnected, it is necessary to select a new 'C_ID.' First, in a case where a terminal's IP address is the highest IP address among those of terminals constructing the network, the terminal uses its own 'Unique_Number' value as a 'C_ID' value and transmits a C_ID_Change packet. In a case where the terminal's IP address is not the highest IP address among those of the terminals constructing the network, the terminal receives the C_ID_Change packet or changes its own 'C_ID' after confirming that 'C_ID' of the Hello packet is changed.

Figure 15:
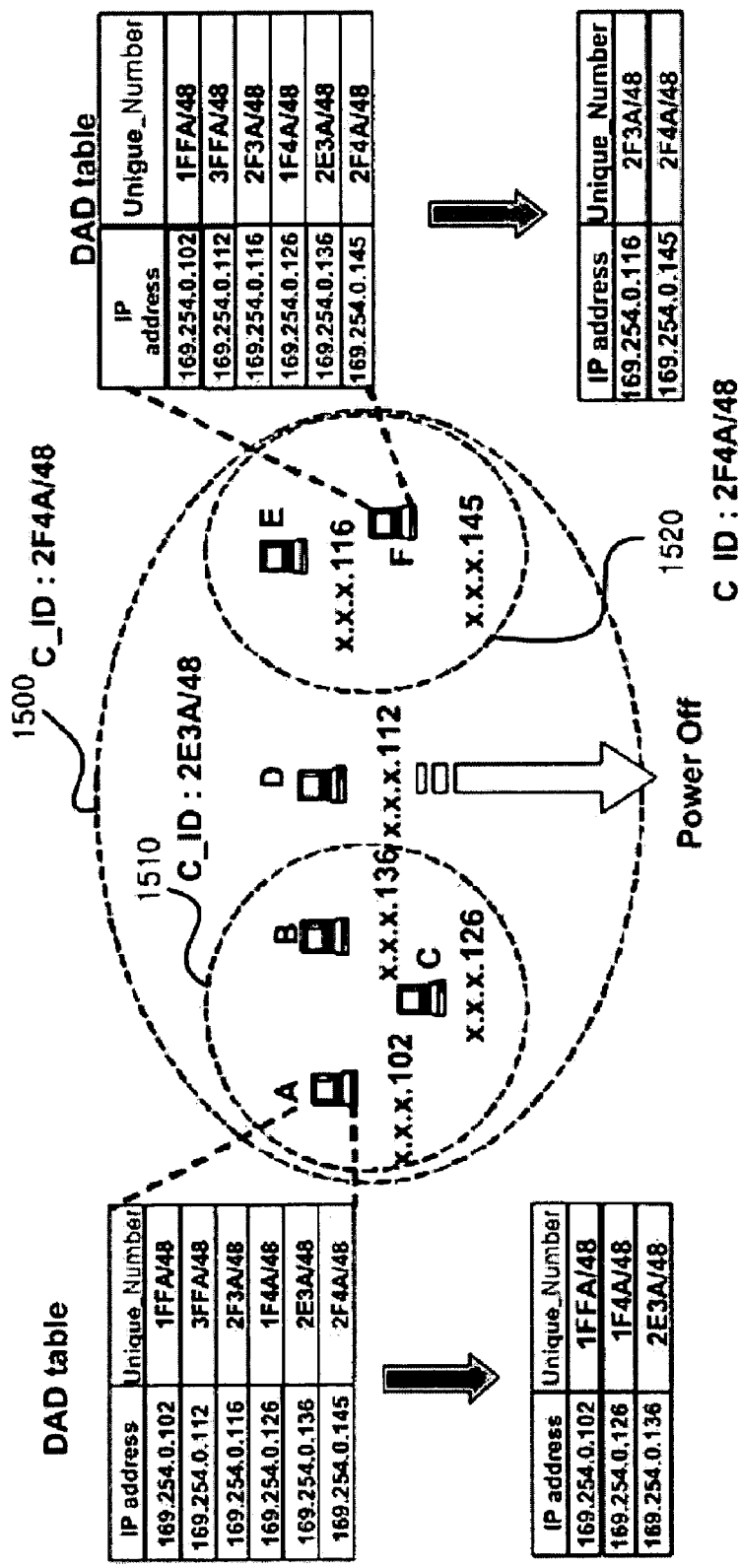
FIG. 15 is an exemplary view showing operations of a single, disconnected MANET.

FIG. 15 is an exemplary view showing operations in a case where a single MANET is disconnected due to its mobility or other situations. Terminals A to F construct the single MANET 1500 with a 'C_ID' value of '2F4A/48' corresponding to a 'Unique_Number' value of terminal F having the highest IP address. At this time, if the power of terminal D is turned off, the MANET is separated into a first MANET 1510 consisting of terminal A, terminal B and terminal C, and a second MANET 1520 consisting of terminal E and terminal F, depending on limitations on a packet transmission distance of each of the terminals. In this case, since it is necessary to reselect a 'C_ID' value, '2E3A/48' that is the 'Unique_Number' of terminal B having the highest IP address becomes a new 'C_ID' value in the first MANET 1510. Further, '2F4A/48' that is the ' Unique_Number' of terminal F having the highest IP address becomes a new 'C_ID' value in the second MANET 1520.

Consistent with the present invention described above, in case of various changes in a MANET such as disconnection or connection of the network due to the mobility of terminals, it is possible to efficiently allocate IP addresses and check for duplicate IP addresses. In a case where the network is disconnected due to loss of a packet, it is possible to efficiently recover the network.

Although the present invention has been described in connection with the exemplary embodiments of the present invention illustrated in the accompanying drawings, it is not limited thereto since it will be apparent to those skilled in the art that various substitutions, modifications and changes may be made thereto without departing from the scope and spirit of the invention.

What is claimed is:

1. A network apparatus operable to detect duplicate Internet Protocol (IP) addresses in a mobile ad hoc network environment, comprising:
    a database operable to store device information on each terminal and an IP address corresponding to the device information;
    an IP address duplicate detector operable to create an identifier for use in identifying a mobile ad hoc network based on the device information and the IP address and operable to process a given packet for detecting duplicate IP addresses; and
    a packet transmitter/receiver operable to transmit/receive a Hello packet containing the identifier or the given packet operable to detect duplicate IP addresses.

2. The apparatus as claimed in claim 1, wherein the device information comprises a Media Access Control (MAC) address assigned to each terminal.

3. The apparatus as claimed in claim 1, wherein the given packet comprises a network information-requesting packet that requests information on an already established network.

4. The apparatus as claimed in claim 1, wherein the given packet comprises a network information-providing packet that provides information on an already established network.

5. The apparatus as claimed in claim 1, wherein the given packet comprises a packet that provides information on a changed identifier when the identifier is changed.

6. The apparatus as claimed in claim 1, wherein if there are two or more identifiers or the identifier is deleted from the database, the IP address duplicate detector reselects device information according to a given condition as a new identifier, based on information stored in the database.

7. The network apparatus according to claim 1, further comprising a duplicate address detection complete packet which notifies a completion of the detection of duplicate IP addresses.

8. The network apparatus according to claim 7, further comprising transmitting/receiving the duplicate address detection complete packet if a duplicate address is not detected as a result of a comparison of a duplicate address detection table of a first terminal with a duplicate address detection table of a second terminal.

9. The network apparatus according to claim 1, wherein the detecting the duplicate IP addresses comprises comparing an IP address of a first terminal with an IP address of a second terminal.

10. A method of detecting duplicate IP addresses in a mobile ad hoc network environment, comprising:
   storing device information on each terminal and an IP address corresponding to the device information;
   creating an identifier operable to be used in identifying a mobile ad hoc network based on the device information and the IP address, and processing a given packet operable to detect duplicate IP addresses; and
   transmitting/receiving a Hello packet containing the identifier or the given packet for detecting duplicate IP addresses.

11. The method as claimed in claim 10, wherein the device information comprises a MAC address assigned to each terminal.

12. The method as claimed in claim 10, wherein the given packet comprises a network information-requesting packet that requests information on an already established network.

13. The method as claimed in claim 10, wherein the given packet comprises a network information-providing packet that provides information on an already established network.

14. The method as claimed in claim 10, wherein the given packet comprises a packet that provides information on a changed identifier when the identifier is changed.

15. The method as claimed in claim 10, further comprising:
   if there are two or more identifiers or the identifier is deleted, reselecting device information according to a given condition as a new identifier, based on the device information and the IP address corresponding to the device information, and processing the given packet for detecting duplicate IP addresses.

* * * * *